United States Patent
Engel (10) Patent No.: US 11,379,114 B2
(45) Date of Patent: Jul. 5, 2022

(54) METHOD FOR UTILIZING PROJECTED GESTURE COMPLETION TO IMPROVE INSTRUMENT PERFORMANCE

(71) Applicant: Keysight Technologies, Inc., Santa Rosa, CA (US)

(72) Inventor: Glenn R Engel, Loveland, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/035,610

(22) Filed: Sep. 28, 2020

(65) Prior Publication Data

US 2021/0011619 A1    Jan. 14, 2021

Related U.S. Application Data

(63) Continuation of application No. 13/750,536, filed on Jan. 25, 2013, now abandoned.

(51) Int. Cl.
*G06F 3/04883* (2022.01)

(52) U.S. Cl.
CPC .................. *G06F 3/04883* (2013.01)

(58) Field of Classification Search
CPC .................................................. G06F 3/04883
See application file for complete search history.

(56) References Cited

U.S. PATENT DOCUMENTS

| | | | |
|---|---|---|---|
| 6,920,619 B1 * | 7/2005 | Milekic | ................. G06F 3/0488 715/702 |
| 7,426,696 B1 | 9/2008 | Hwang | |
| 9,052,819 B2 | 6/2015 | Kawalkar | |
| 2003/0122787 A1 | 7/2003 | Zimmerman | |
| 2005/0206658 A1 | 9/2005 | Fagans | |

(Continued)

FOREIGN PATENT DOCUMENTS

| | | |
|---|---|---|
| CN | 101866268 A | 10/2010 |
| CN | 101901107 A | 12/2010 |

(Continued)

OTHER PUBLICATIONS

China Office Action dated Dec. 18, 2017, Application No. 201310724114.6.

(Continued)

*Primary Examiner* — Jennifer N Welch
*Assistant Examiner* — K C Chen (57) ABSTRACT

A method of operating a first data processing system having a screen for responding to a vector gesture performed on that screen is disclosed. The method includes estimating a direction and assuming an identity for the vector gesture prior to the vector gesture being completed. A command that depends on the estimated direction and assumed identity is executed, the command being a command that would be required to update a current state of the first data processing system if the assumed identity of the vector gesture is correct. The command is executed prior to the vector gesture being completed. The current state of the first data processing system is then updated based on the data generated by the command. After the vector gesture has been determined to have been completed, the first data processing system is updated to a state indicated by the completed vector gesture.

20 Claims, 5 Drawing Sheets

(56) References Cited

U.S. PATENT DOCUMENTS

| | | | |
|---|---|---|---|
| 2008/0129686 A1* | 6/2008 | Han | G06F 3/0488 |
| | | | 345/156 |
| 2009/0100383 A1 | 4/2009 | Sunday | |
| 2010/0302281 A1 | 12/2010 | Kim | |
| 2010/0302283 A1 | 12/2010 | Sasaki | |
| 2011/0175832 A1 | 7/2011 | Miyazawa | |
| 2012/0127209 A1 | 5/2012 | Yajima | |
| 2012/0284664 A1 | 11/2012 | Zhao | |
| 2013/0191790 A1* | 7/2013 | Kawalkar | G06F 3/04883 |
| | | | 715/863 |
| 2013/0222329 A1 | 8/2013 | Larsby | |

FOREIGN PATENT DOCUMENTS

| | | |
|---|---|---|
| CN | 102129314 A | 4/2011 |
| CN | 102473075 A | 5/2012 |
| JP | 2009140119 A | 6/2009 |
| WO | 03060622 A2 | 7/2003 |

OTHER PUBLICATIONS

China Office Action dated Aug. 31, 2018, Application No. 201310724114.6.

China Office Action dated Feb. 25, 2019, Application No. 201310724114.6.

China Office Action dated Nov. 8, 2019, Application No. 201310724114.6.

Office Action dated Aug. 4, 2021, China Application No. 201310724114.6.

* cited by examiner

METHOD FOR UTILIZING PROJECTED GESTURE COMPLETION TO IMPROVE INSTRUMENT PERFORMANCE

CROSS-REFERENCE TO RELATED APPLICATIONS

The present application is a continuation application under 37 C.F.R. § 1.53(b) of U.S. patent application Ser. No. 13/750,536 filed on Jan. 25, 2013 (Published as U.S. Patent Application Publication No. 20140215382). Priority under 35 U.S.C. § 120 is claimed from U.S. patent application Ser. No. 13/750,536, and the entire disclosure of U.S. patent application Ser. No. 13/750,536 is specifically incorporated herein by reference.

BACKGROUND

The use of gestures on a touch display screen to control an underlying computer program has become commonplace. There is a class of gestures in which the user moves one or more fingers while in continuous contact with the screen. For example, the user may scroll down a list or pan a view by touching the screen and moving a finger in the desired direction. Similarly, "pinch" gestures are used to zoom in or out on a scene that is displayed on the screen.

Touch screens are also being used to control measurement instruments. The screen can be the display on a computer that directly controls the measurements or on a mobile device that is connected to the instrument via a network that may include the Internet and/or part of a wireless telecommunication network. Consider a case in which a mobile device is being used to control an instrument. The control depends on the data that is currently displayed on the screen of the mobile device. To update the screen data, the mobile device must send the appropriate command to the instrument and wait for the instrument to return the new data. If the time to execute the gesture is a significant fraction of the total time to update the display, the gesture introduces a delay into the control of the instrument and/or the display of information on the screen. Such delays lead to an interface that is "jumpy" or "sluggish". If the gesture is part of a control loop, the resulting system can oscillate.

For example, if the user is looking for a value in a list by scrolling through the list, the user may use a "fling" gesture. If the mobile device waits until the gesture is completed, there is a delay between starting the gesture and viewing the new data on the screen. This delay is added to any delay introduced by the instrument and the communication link in returning the data indicated by the gesture. If the user determines that further scrolling is needed, another gesture is executed, and so on.

SUMMARY

The present invention includes a method of operating a first data processing system having a screen for responding to a vector gesture performed on that screen. The method includes estimating a direction and assuming an identity for the vector gesture prior to the vector gesture being completed. A command that depends on the estimated direction and assumed identity is executed, the command being a command that would be required to update a current state of the first data processing system if the assumed identity of the vector gesture is correct. The command is executed prior to the vector gesture being completed. The current state of the first data processing system is then updated based on the data generated by the command. After the vector gesture has been determined to have been completed, the first data processing system is updated to a state indicated by the completed vector gesture.

In one aspect of the invention, the command causes a second data processing system to provide data to the first data processing system.

In another aspect of the invention, updating the current state of the first data processing system includes updating a display on the first data processing system with data obtained from executing the command. In a still further aspect of the invention, the current state includes a first scene on the screen, and the assumed identity includes a scrolling gesture that indicates that the first scene is to be scrolled in the determined direction.

In a further aspect of the invention, the current state includes displaying a first scene on the screen, and updating the current state includes providing a partially scrolled version of the first scene.

In another aspect of the invention, updating the first data processing system to a state indicated by the completed vector gesture includes displaying a first scene on the screen followed by a second scene having a higher resolution than the first scene.

In a further aspect of the invention, estimating a direction and assuming an identity for the vector gesture are repeated if the vector gesture is not completed when the results of the command are completed.

DETAILED DESCRIPTION

The present invention can be more easily understood with regard to a class of gestures that involve the movement of an object on the screen in which the gesture involves an object that moves in a first direction and ends either by slowing the rate of motion or the lifting of the object off of the screen. The object is typically one or more fingers of a user. However, the teachings of the present invention can be applied to other objects such as a stylus. It should also be noted that the object could be a virtual object such as the pointer controlled by a mouse. The pointer "touches" the screen when a specific button is depressed and leaves the screen when the button is released.

The direction of motion is typically a linear direction; however, gestures that utilize rotational movements can also be accommodated. For example, a gesture with two fingers could simulate turning a knob that is displayed on the screen.

The present invention is based on the observation that, in many cases, the operations that must be performed to provide an updated display that is specified through a gesture can be started, if not completed, before the gesture is completed. Hence, the display can be updated while the gesture is being performed to provide a display that is more nearly consistent with the gesture at any point during the performance of the gesture.

Figure 1:
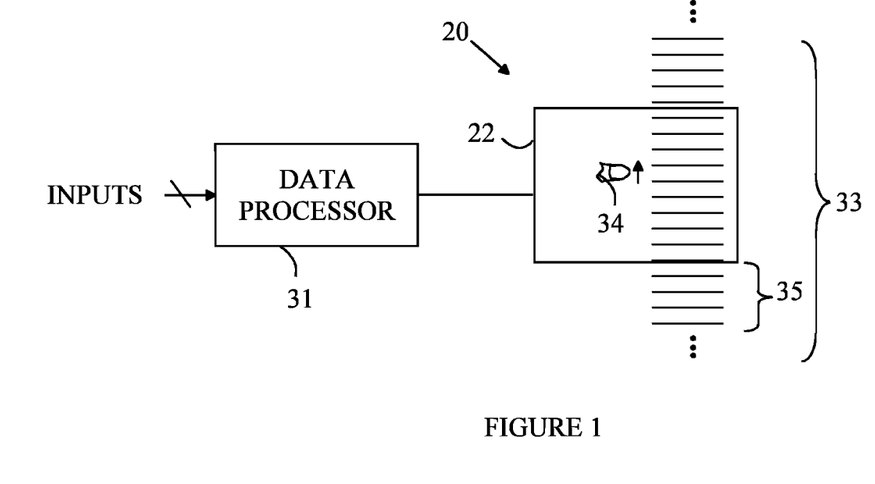
FIG. 1 illustrates a mobile device that utilizes the method of the present invention.

The manner in which the present invention provides its advantages can be more easily understood with reference to FIG. 1, which illustrates a mobile device that utilizes the method of the present invention. Mobile device 20 has a touch-enabled screen 22 that displays data to the user of mobile device 20 and receives commands in the form of touch gestures. Mobile device 20 communicates with data processor 31 that stores or generates data that is displayed on mobile device 20 in response to touch gestures performed on touch-enabled screen 22. In the example shown in FIG. 1, mobile device 20 displays a portion of a list 33 that is received from data processor 31. Touch-enabled screen 22 can be viewed as a window through which the user views a portion of the list, which is too large to be able to be seen all at once.

The user of mobile device 20 wishes to scroll through list 33 by executing a fling gesture on touch-enabled screen 22. For the purposes of this discussion, a fling gesture is indicated by the user moving the user's finger 34 on touch-enabled screen 22 while maintaining contact with touch-enabled screen 22 in a rapid motion in which the finger is still moving when the finger is lifted. During the fling gesture, the list scrolls through the window in a manner in which the user sees the portion of the list currently in the window. The speed at which the list scrolls through the window after the user lifts his or her finger decreases over time until the scrolling finally stops leaving a portion of the list visible in the window if the user takes no further action. However, if the user touches the screen again after lifting his or her finger and during the time the list is still scrolling, the scrolling stops leaving the currently visible portion of the list in the window. Hence, the scroll gesture is not completed until the scrolling stops, since the gesture could include a premature stop indicated by the user again touching the screen. The direction of the motion of the user's finger specifies which way the list is to be scrolled. The speed with which the user moves finger 34 determines the time and speed after the lifting of the finger during which the list will continue to scroll. Data processor 31 sends the data needed to augment the display on mobile device 20 in response to the gesture.

The direction in which the window is to move relative to list 33 can be determined as soon as the user begins the gesture. However, the distance that mobile device 20 is to shift the list will not be known until the gesture is completed. In the present invention, mobile device 20 determines the direction and signals data processor 31 to begin generating and sending the data in region 35 of list 33. In one aspect of the invention, the data is sent in the order the data appears in the list with the data nearest the portion of the list that is currently being displayed sent first. As the data is received, mobile device 20 updates touch-enabled screen 22 by augmenting the portion of the list that is visible in the indicated direction. Thus, the update of the display commences prior to the gesture being completed.

When the gesture is completed, mobile device 20 ascertains the extent of the requested scroll. If the updated display already reflects the desired scroll, mobile device 20 terminates the update operation. However, in general, the displayed portion of the list will not coincide with the requested update as determined by the fling operation. If the amount of data received from data processor 31 at the end of the gesture is less than that needed to satisfy the gesture, mobile device 20 continues to request data from data processor 31 until the desired data has been received and displayed. If the data received at the end of the gesture is sufficient to update the display, mobile device 20 adjusts the display to reflect the indicated amount of scrolling. This may involve rolling back the scrolled list if the display has already been scrolled past the desired end point.

Consider the case in which data processor 31 cannot provide the information to mobile device 20 with sufficient speed to allow mobile device 20 to provide the user with the completed scrolled display at the end of the gesture. This situation can be the result of the limitations in the bandwidth between data processor 31 and mobile device 20, as well as limitations in the time needed to generate the data in data processor 31. If touch-enabled screen 22 is updated as the information arrives and the information is sent in the order the data appears in the list, then touch-enabled screen 22 will show a continuous slow update, which may not be the most esthetic form of update from the user's point of view, since the user may be more interested in the data near the end of the updated portion of the list.

Consider the case of a fling. When the user lifts his or her finger from the display, the end point of the list that will be in the final screen display is known assuming that the user does not stop the fling prematurely by touching the screen. However, to provide the user with the view of the data that scrolls through the window on the list on the way to the final screen display, the various intermediate list items must be sent and displayed to allow the user to decide if the user wishes to prematurely end the scroll.

In one aspect of the invention, these intermediate list items can be sent and displayed in a low bandwidth form that is sufficient for the user to determine if the user wants to stop the scroll. For the purposes of this discussion, a low bandwidth form of the list is defined to be a form that can be sent to the mobile device in less time than the list would be sent if the list were to be displayed on the screen in final form. For example, this could be a form in which only the first few words of each list item are sent, a form in which the items are sent with abbreviations in place of the words or phrases, or a form in which every $n^{th}$ entry in the list is sent. If the user stops the scroll prematurely based on this low bandwidth form of the list, the correct form of each item that is to be displayed is used in place of the low bandwidth form. The use of the reduced bandwidth form of the list frees bandwidth for sending the final form of the portion of the list that is to be displayed or a more esthetic scroll that moves at the desired speed.

In another aspect of the invention, the update information is sent in an order that allows the user to view the data near the end of the update prior to the other information appearing. For example, if the last entry in the updated list is known, that entry can be sent next so that it appears on mobile device 20. The missing items are then sent in an order that depends on the particular mode of operation. For example, the missing items can be sent in a random order so that the user can view items at different locations in the update list to determine if further scrolling is required. Alternatively, the list can be filled by working backwards from the last entry or forward from the last received entry that is in the completed portion of the list.

This type of non-ordered update can be more easily understood with respect to a display that shows an analog signal such as a graph of the signal intensity as a function of time or some other parameter such as frequency. Such displays are common in mobile devices that control or view data from an instrument such as an oscilloscope or frequency analyzer.

For example, consider a scene that shows a signal as a function of some variable, X. The user controls the zoom level of the signal to alter the portion and resolution of the signal displayed on a device with a touch screen by executing a "zoom gesture". For the purposes of this example, it will be assumed that the user wishes to zoom out thereby displaying more of the signal at a lower resolution on a mobile device that is used to control the instrument that provides the data. To provide the new display, data related to the part of the scene that is not currently being displayed is required. Once the mobile device determines that a zoom out has started, the mobile device can begin to acquire additional data on each side of the current scene and add that data to the current display. When the user finishes the zoom operation, the additional data will already have been provided, or at least some significant fraction thereof. This provides the appearance of a display that is continuously updated with the zoom operation. In one aspect of the invention, the computer can predict approximately where the gesture will complete. For example, if a pinch zoom gesture is used, the pinch zoom cannot exceed the width of the user's finger span; hence, the maximum amount of data that may be required can be predicted when the pinch zoom begins.

Figure 2:
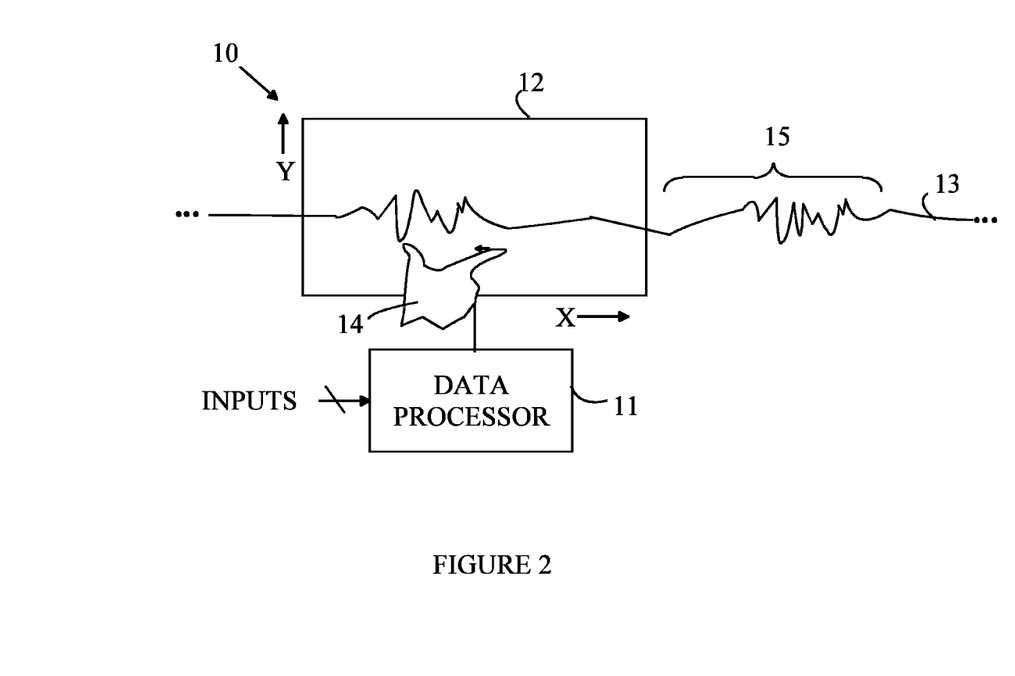
FIGS. 2-3 illustrate the manner in which a zoom out gesture is implemented in one embodiment of the present invention.
Figure 3:
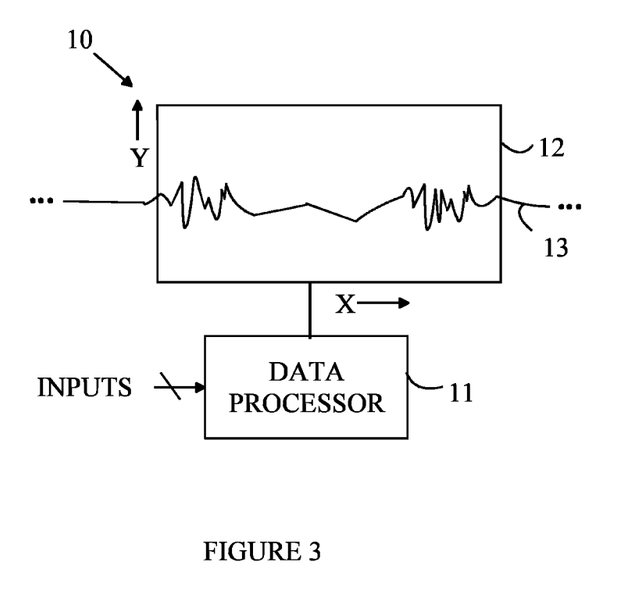

Refer now to FIGS. 2-3, which illustrate the manner in which a zoom out gesture is implemented in one embodiment of the present invention. A touch-enabled display screen 12 that is part of a mobile device 10 currently shows the portion of curve 13 that is within the boundaries of touch-enabled display screen 12. A user 14 of mobile device 10, signals data processor 11, which either stores the entire trace or can generate the portions that are outside the range currently displayed by mobile device 10, by performing a pinch gesture on touch-enabled display screen 12. The degree of the zoom is determined by the distance that the user moves the user's fingers together during the pinch zoom gesture. This information will not be available until the user completes the gesture.

However, as soon mobile device 10 recognizes the gesture as a pinch zoom gesture, mobile device 10 signals data processor 11 to begin sending the needed portions outside the current window such as portion 15. As noted above, in one aspect of the invention, the data is sent in an order that gives priority to the portions of curve 13 that are nearest the portions already being displayed, since those are the portions that are most likely going to be needed to satisfy the pinch zoom command. Data processor 11 begins sending the portions that may be needed before the pinch gesture is completed. The display is updated by decimating the portion of the curve that is to remain displayed at the lower resolution and adding the new data to that portion as the new data is sent.

touch-enabled display screen 12 with the data as the data arrives. If the data available at mobile device 10 is sufficient to generate the correct display if the pinch zoom operation were to terminate at its current location, the display will smoothly follow the pinch zoom. If the data is not sufficient, the display will appear to be continuously changing and will catch up after the pinch zoom terminates. Mobile device 10 can determine the maximum amount of data needed to satisfy the pinch zoom, since that corresponds to the minimum distance between the user's fingers. Hence, if data is sent faster than needed to keep up with the pinch zoom, at most, some additional data will have been sent to mobile device 10 if the gesture ends at a point less than this minimum distance.

If the display cannot be updated to keep up with the data required by the zoom operation, then utilizing a mode in which the update information is sent out of the above-indicated order can be utilized. For example, the missing portions of the curve can be provided in an order that allows an approximation to the final display to be generated by the time the pinch zoom gesture is completed. The approximation is then refined as more data is received. For example, an approximation to the final curve could be generated by sending every nth point to mobile device 10 in the region in which data is missing. These points would then be fitted to a curve that is displayed on touch-enabled display screen 12. After these points have been sent, points that are intermediate to these would then be sent. As additional points arrive to fill in the missing points, the data points are then refitted to a curve and displayed. In this manner, the display appears at its final resolution and updates provide a more detailed view of the data. Since the human eye has difficulty perceiving rapidly changing scenes at high resolution, this form of update hides the underlying "noise" resulting from the approximation of the curve by the incomplete data set.

Figure 4:
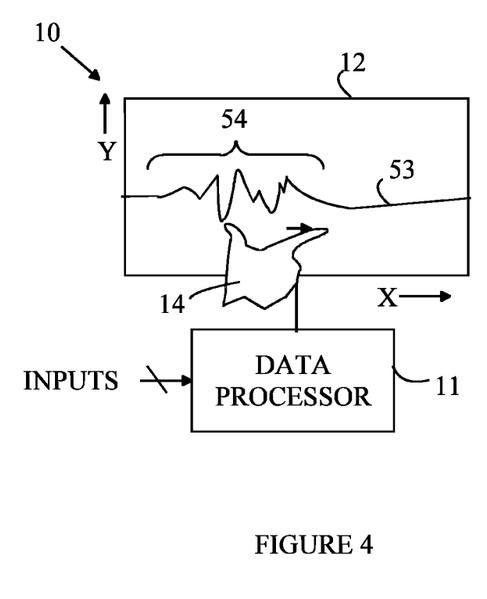
FIGS. 4-6 illustrate a zoom in operation in which the missing data points are sent in an order that allows an approximation to the final display to be generated before the entire data set needed for the display is sent from the data processor.
Figure 5:
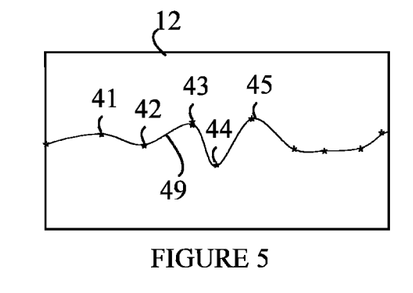
Figure 6:
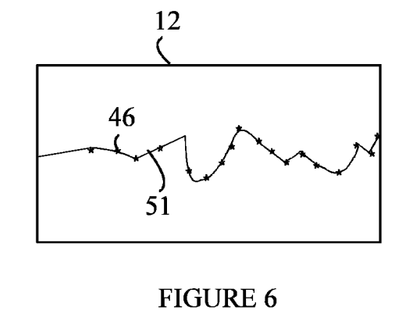

Similarly, during a zoom in operation, the missing data is the data between the existing points on the portion of the display that remains within the region displayed on touch-enabled display screen 12. Refer now to FIGS. 4-6, which illustrate a zoom in operation in which the missing data points are sent in an order that allows an approximation to the final display to be generated before the entire data set needed for the display is sent from the data processor. Referring to FIG. 4, user 14 indicates that the user wishes to zoom in on the portion of curve 53 shown at 54 by executing a zoom in pinch gesture. The final display will include some of the data points that are currently stored in mobile device 10 together with a set of additional points that provide information about curve 53 between the points that are currently being displayed. When the zoom in operation commences, mobile device 10 signals data processor 11 to commence sending data points between the existing data points. By the time the zoom in gesture is completed, mobile device 10 has accumulated the data points in FIG. 5. Exemplary data points are labeled at 41-45. These data points are used to generate an approximation 49 to the final display. As additional data points arrive for locations between the existing data point locations such as data point 46 shown in FIG. 6, touch-enabled display screen 12 is updated to provide a better approximation to the final curve as shown at 51.

The above-described embodiments of the present invention have utilized specific touch-enabled gestures operating on a mobile device such as a tablet or smart phone. However, the present invention may be utilized in any data processing system that responds to certain gestures on a touch-enabled display. For the purposes of this discussion, a vector touch gesture is defined to be a gesture that is characterized by a direction and a magnitude in which the exact magnitude is not known until the gesture is completed. The direction, in contrast, can be determined by the data processing system prior to the time at which the magnitude can be ascertained.

Figure 7:
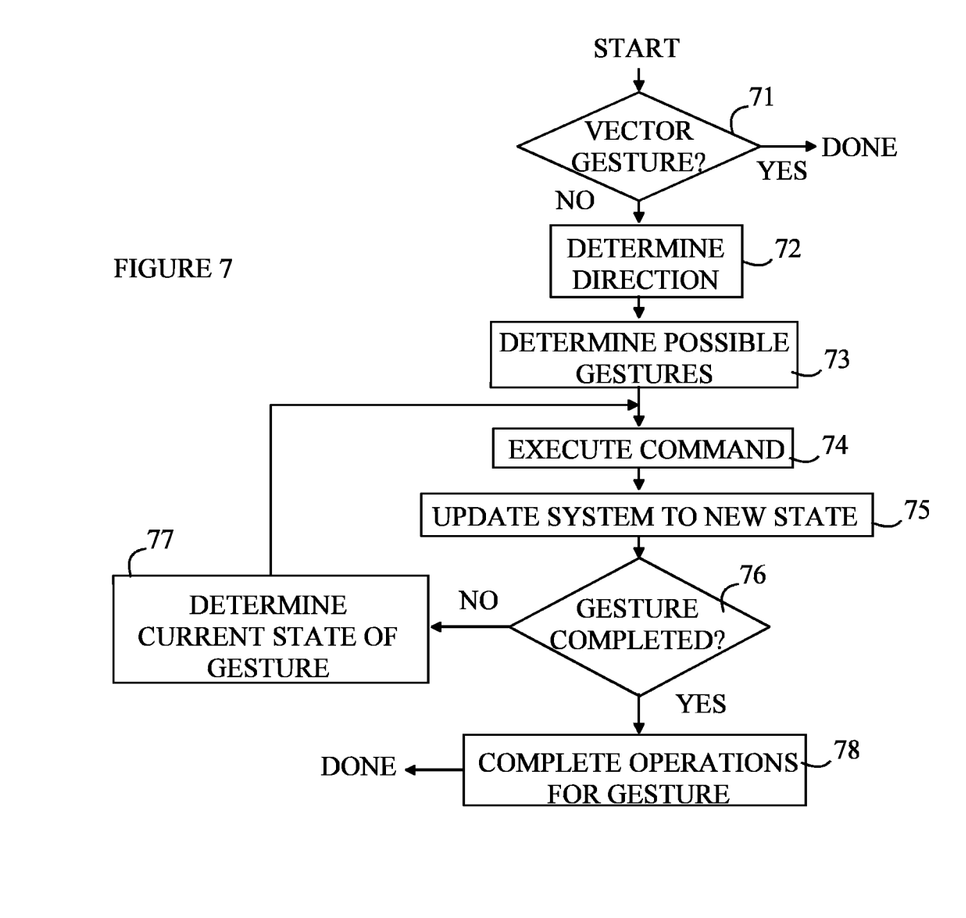
FIG. 7 is a flow chart for one embodiment of a method according to the present invention.

Refer now to FIG. 7, which is a flow chart for one embodiment of a method according to the present invention. The data processing system that operates the touch-enabled display detects a touch gesture that is initiated on the touch-enabled display and determines if the gesture is a vector gesture as shown at 71. If the touch gesture is a vector touch gesture, the data processing system determines the direction associated with that touch direction as shown at 72. In addition, the data processing system determines a set of vector touch gestures that could be the one being implemented as shown at 73.

It should be noted that the specific vector gesture may not be exactly known until the vector gesture is completed. For example, a scrolling operation could be performed by a fling or a conventional scroll in which the user moves the user's finger in a continuous manner while in contact with the screen but stops the motion before lifting the finger. A fling, in contrast, is characterized by the finger being in motion at a speed greater than some threshold speed when the finger is lifted. The data processing system cannot determine which scrolling operation is being requested until the user actually lifts the user's finger.

After the data processing system determines the set of possible gestures that could be in progress, the data processing system uses the determined direction and the current state of the gesture to execute a command that will at least partially perform work needed to respond to one or more of the possible gestures as shown at 74. For example, consider the case in which all of the possible gestures require a display to be scrolled from its current state to a final state, the scrolling being performed in the determined direction. When the direction is determined, the finger position or positions will have advanced to a new location that provides some additional information about the magnitude associated with the vector gesture. For example, from the current position, the data processing system can determine the minimum distance that the display will need to be scrolled, and hence, the minimum amount of new information needed to execute the scroll. A maximum distance the display could be scrolled in the current possible gesture can also be determined. For example, if the current gesture were a conventional scroll, the maximum distance is determined by measuring the scroll distance corresponding to the user's finger reaching the edge of the screen in the current direction. If the scroll operation was a fling, the maximum distance would be determined by the current scroll speed and some estimate for the maximum speed of the finger when it is lifted.

In the case of a scroll operation, the command returns data needed to provide the display in a scrolled state that is a better approximation to the final state than the current state. In general, the system is updated based on the results of those commands as shown at 75. For example, an updated display could be generated based on the results of the executed commands as the data from those commands is received. The commands can continue to elicit data needed to execute the maximum possible scroll in the case of a scroll. If the scroll requires less than this amount of data, the excess data can be ignored or saved to facilitate a future operation.

After the commands are executed, the data processing system determines if the gesture has been completed as shown at 76. If the gesture has not been completed, the current state of the gesture is determined as shown at 77. The state is determined from the current locations of the user's fingers. This information is used to update the possible set of gestures and determine further commands to be executed based on the current estimate of the fingers.

If the data processing system determines that the gesture is finished, the data processing completes the operations specified by the gesture as shown at 78. The completion may require that the results from one or more commands that were previously issued be received. In addition, the completion may require additional commands. For example, in the case of a fling gesture, additional data may need to be requested before the screen can be updated to its final form.

The above-described examples are directed to actions that result in an updated display. However, actions that control a device that is in communication with the data processing system could also be utilized. In this case, the command could be a command that is sent to an external device that causes that device to carry out an operation. The operation in question could result in an updated display; however, such an update is not necessarily required. For example, an instrument that is separate from the mobile device may be updated without changing the display on the mobile device.

The above-described embodiments have utilized a mobile device with a touch-enabled screen. However, the present invention can be practiced on any data processing system that has a touch-enabled screen and software to detect one or more vector gestures. Touch-enabled screens are available on desktop systems as well as mobile devices. It should also be noted that the screen view being updated need not be the touch-enabled screen. A system with two screens, one touch enabled and the other a conventional screen could benefit from the present invention being utilized to receive the vector gestures on the touch-enabled screen, while updating the conventional display.

The present invention also includes any computer readable medium that stores instructions that cause a computer reading that medium to execute the method of the present invention. For the purposes of the present discussion, any computer readable medium that qualifies as patentable subject matter under 35 U.S.C. 101 will be defined to be a computer readable storage medium. Such media include non-transitory storage media such as non-volatile memories, magnetic and optically-based disk drives and storage elements read by those disk drives.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method of operating a first data processor comprising a screen, which comprises a touch-enabled screen, for responding to a vector gesture performed on said screen, said vector gesture's being characterized by making contact between an object and said screen at a point of contact on said screen and a movement of said object from said point of contact in a direction on said screen without breaking said contact, said method comprising:

detecting said contact between said object and said screen at said point of contact on said screen;

determining said direction;

assuming an identity for said vector gesture from said point of contact and said direction prior to said vector gesture's being completed, but after detecting said contact between said object and said screen at said point of contact;

executing a command after detecting said contact between said object and said screen at said point of contact, said command being required to update a current state of said first data processor when said assumed identity of said vector gesture is correct, said command being executed prior to said vector gesture's being completed; and updating said current state of said first data processor based on a result generated by said command, wherein said first data processor determines an end point for a display to be provided on said screen in response to a fling gesture characterized by said object being in motion at a speed greater than a threshold speed when the object is lifted from said screen.

2. The method of claim 1, further comprising:
determining when said vector gesture has been completed; and
updating said first data processor to a state indicated by said completed vector gesture when said vector gesture was completed.

3. The method of claim 2, wherein determining said direction and assuming an identity for said vector gesture is repeated when said vector gesture was not completed after detecting said contact between said object and said screen at said point of contact, said determining said direction and assuming an identity for said vector gesture being repeated based on a current location of said object and said screen.

4. The method of claim 1, wherein said command causes a second data processor to provide data to said first data processor.

5. The method of claim 1, wherein updating said current state of said first data processor comprising updating a display on said first data processor with data obtained from executing said command.

6. The method of claim 1, wherein said current state comprises a first scene on said screen and said assumed identity comprises a scrolling gesture that indicates that said first scene is to be scrolled in said direction.

7. The method of claim 1, wherein said current state comprises displaying a partially scrolled scene on said screen, said update to said current state comprises a partially scrolled version of said first scene.

8. The method of claim 1, wherein said first data processor displays intermediate displays that are not part of a final display that would be provided when said fling gesture is not terminated prematurely by touching said screen in a low bandwidth form to allow said fling to be terminated prematurely by touching said screen.

9. A non-transitory computer readable medium that comprising instructions that cause a data processor to execute a method of operating a first data processor comprising a screen, which comprises a touch-enabled screen, for responding to a vector gesture performed on said screen, said vector gesture's being characterized by making contact between an object and said screen at a point of contact on said screen and a movement of said object from said point of contact in a direction on said screen without breaking said contact, said method comprising:
detecting said contact between said object and said screen at said point of contact on said screen;
determining said direction;
assuming an identity for said vector gesture from said point of contact and said direction prior to said vector gesture's being completed, but after detecting said contact between said object and said screen at said point of contact;
executing a command after detecting said contact between said object and said screen at said point of contact, said command being required to update a current state of said first data processor when said assumed identity of said vector gesture is correct, said command being executed prior to said vector gesture's being completed; and
updating said current state of said first data processor based on a result generated by said command, wherein said first data processor determines an end point for a display to be provided on said screen in response to a fling gesture characterized by said object being in motion at a speed greater than a threshold speed when the object is lifted from said screen.

10. The non-transitory computer readable medium of claim 9 further comprising:
determining when said vector gesture has been completed; and
updating said first data processor to a stated indicated by said completed vector gesture when said vector gesture was completed.

11. The non-transitory computer readable medium of claim 10, wherein determining said direction and assuming an identity for said vector gesture is repeated when said vector gesture was not completed after detecting said contact between said object and said screen at point of contact starting location, said determining said direction and assuming an identity for said vector gesture being repeated based on a current location of said object and said screen.

12. The non-transitory computer readable medium of claim 9, wherein said command causes a second data processor to provide data to said first data processor.

13. The non-transitory computer readable medium of claim 9, wherein updating said current state of said first data processor comprises updating a display on said first data processor with data obtained from executing said command.

14. The non-transitory computer readable medium of claim 9, wherein said current state comprises a first scene on said screen and wherein said assumed identity comprising a scrolling gesture that indicates that said first scene is to be scrolled in said estimated direction.

15. The non-transitory computer readable medium of claim 14, wherein said current state comprises displaying a partially scrolled scene on said screen, said update to said current state comprises a partially scrolled version of said first scene.

16. The non-transitory computer readable medium of claim 9, wherein said first data processor displays intermediate displays that are not part of a final display that would be provided when said fling gesture is not terminated prematurely in a low bandwidth form to allow said fling to be terminated prematurely by touching said screen.

17. An apparatus, comprising:
a first data processor;
a touch-enabled screen adapted to respond to a vector gesture performed thereon, wherein the vector gesture comprising making contact between an object and the touch-enabled screen at a point of contact on the touch-enabled screen and a movement of the object from the point of contact in a direction on the touch-enabled screen without breaking contact;
a non-transitory computer-readable medium that stores instructions, which when executed by the first data processor, cause the first data processor to:
detect the contact between the object and the touch-enabled screen at the point of contact on the touch-enabled screen;
determine the direction;
assume an identity for the vector gesture from the point of contact and the direction prior to the vector gesture's being completed, but after detecting the contact between the object and the touch-enabled screen at the point of contact;
execute a command after detecting the contact between the object and the touch-enabled screen at the point of contact that depends on the assumed identity, the direction, and the point of contact, the command being required to update a current state of the first data processor when the assumed identity of the vector gesture is correct, the command being executed prior to the vector gesture's being completed; and update the current state of the first data processor based on a result generated by the command, wherein the first data processor determines an end point for a display to be provided on the touch-enabled screen in response to a fling gesture characterized by the object being in motion at a speed greater than a threshold speed when the object is lifted from the touch-enabled screen.

18. The apparatus of claim 17, wherein the instructions when executed by the first data processor, further cause the first data processor to:

determine when the vector gesture has been completed; and update the first data processor to a state indicated by the completed vector gesture when the vector gesture was completed.

19. The apparatus of claim 17, wherein the command causes a second data processor to provide data to the first data processor.

20. The apparatus of claim 17, wherein the current state comprises a first scene on the touch enabled screen and wherein the assumed identity comprising a scrolling gesture that indicates that the first scene is to be scrolled in the direction.

* * * * *

UNITED STATES PATENT AND TRADEMARK OFFICE
CERTIFICATE OF CORRECTION

PATENT NO. : 11,379,114 B2
APPLICATION NO. : 17/035610
DATED : July 5, 2022
INVENTOR(S) : Glenn R Engel It is certified that error appears in the above-identified patent and that said Letters Patent is hereby corrected as shown below:

In the Claims

In Column 9, Line 29, in Claim 7, delete "claim 1," and insert -- claim 6, --.

In Column 9, Line 39, in Claim 9, delete "medium that" and insert -- medium --.

Signed and Sealed this
Sixth Day of September, 2022

*Katherine Kelly Vidal*

Katherine Kelly Vidal
*Director of the United States Patent and Trademark Office*